April 10, 1928.
R. G. STANDERWICK
1,665,897
ELASTIC CONNECTION
Filed April 23, 1926
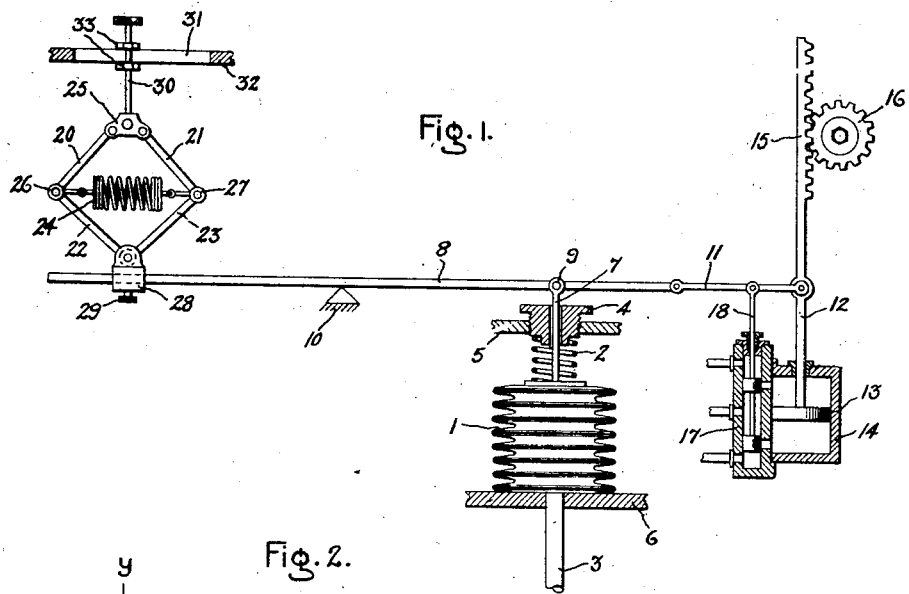
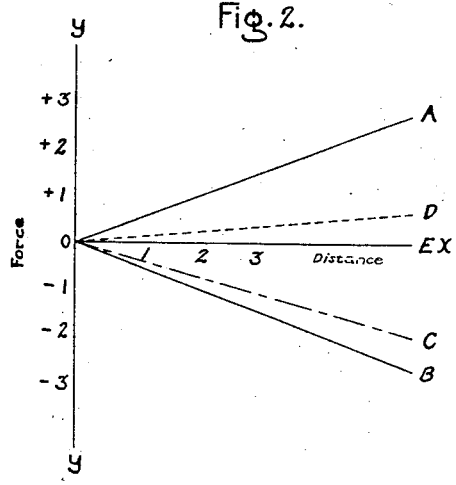
Inventor:
Reginald G. Standerwick;
by
His Attorney.

Patented Apr. 10, 1928.

1,665,897

UNITED STATES PATENT OFFICE.

REGINALD G. STANDERWICK, OF MARBLEHEAD, MASSACHUSETTS, ASSIGNOR TO GENERAL ELECTRIC COMPANY, A CORPORATION OF NEW YORK.

ELASTIC CONNECTION.

Application filed April 23, 1926. Serial No. 104,235.

In connection with the operation of machines of various types, it becomes necessary often to transmit a force through the intermediary of a simple elastic connection so as to obtain a movement proportional to the magnitude of such force, it being understood that by a simple elastic connection I mean an elastic device which has a straight line characteristic. Elastic connections in ordinary use comprise usually a spring, a diaphragm, a bellows or the like, or some combination of them. It is subjected to the desired operating force so as to be moved by such force, and such movement is utilized to effect the operation of a mechanism which is to be actuated by the operating force. Since a simple elastic connection has a straight line characteristic, the operating force required to contract or extend the connection increases uniformly with the amount of the contraction or extension. That is to say, if it requires one unit of force to move the connection one unit of distance, then it requires two units of force to move it two units of distance, three units of force to move it three units of distance, and so on. In the utilization of elastic connections, it is desirable often that the actual change in force required to effect successive movements of the connection should be relatively small. However, it is not possible usually, in actual practice, to provide ordinary simple elastic connections capable of being moved by small changes in force because of mechanical difficulties and limitations. Also, it is desirable that an elastic connection be capable of adjustment whereby its characteristic may be changed readily.

The primary object of my invention is to provide in an elastic connection, an improved construction and arrangement whereby the characteristic of any given simple elastic connection may be modified to any desired extent and whereby the extent to which it is modified may be changed or adjusted at will, and this without requiring a redesign of the elastic connection or without any departure from its inherent straight line characteristic. For example, taking the case of a coiled spring, it is well known that the scale, that is, the force per inch of deflection of a spring, is inversely proportional to the number of active turns of that spring, within the elastic limit of said spring, so that in order to reduce the force required to deflect a given coiled spring 1″ to one-half the original value, twice the number of active turns would have to be employed, and so on. In other words, a redesign of the spring would be required. By means of my invention, I am able to keep the original number of active turns of a given spring and reduce the force required to deflect it gradually to any value, even down to that which is termed usually the condition of an isodynamic mechanism, in which barring friction and inertia, no change in force is required to hold the deflection of the given spring or other simple elastic connection at any desired value.

According to my invention, I take an ordinary simple elastic connection having the usual straight line characteristic and I provide in connection therewith what I term an inverted elastic connection, this being an elastic connection which likewise has a straight line characteristic but which, however, is of a construction and arrangement such that it provides a force which varies inversely with the deflection. That is to say, at maximum deflection the force is zero and increases as the deflection decreases within the certain limits of the device, as is explained hereinafter.

In the drawing, Fig. 1 is a diagrammatic view of one construction embodying my invention; Fig. 2 is a diagram illustrating the action of the elastic connections of Fig. 1.

Referring to the drawing, 1 indicates a simple elastic connection here shown as being in the form of a corrugated bellows loaded with an adjustable spring 2. Connected to bellows 1 is a conduit 3 through which a fluid force may be applied to it to effect movement of it. Spring 2 is located between the top of bellows 1 and a collar 4 which is adjustable on a fixed support 5. By turning collar 4, the initial compression of spring 2 on the bellows may be adjusted. This forms a simple elastic connection of known type which is used extensively, and is to be taken as typical of any suitable simple elastic connection. It may be used for any desired purpose, such as, for example, for regulating the admission valve means of an elastic fluid turbine in response to pressure.

The bottom wall of bellows 1 is fixed to a stationary support 6 and the top wall, which is the movable wall, is connected by a stem 7 to a lever 8, the pivot being indicated at 9. Lever 8 is mounted on a fulcrum 10 and at one end is connected by a floating lever 11 to a rod 12. Rod 12 is connected at its lower end to a piston 13 which moves in a cylinder 14, the same forming a fluid-actuated motor. Rod 12 may actuate any desired mechanism. In the present instance it is shown as having a rack 15 at its upper end which meshes with a pinion 16 which may be the pinion through which the cam shaft operating the regulating valve means for an elastic fluid turbine is moved. An example of such an arrangement is shown in the patent to Dryer, 1,471,316, dated October 16, 1923. The pilot valve for the fluid-actuated motor is indicated at 17 and it has its stem 18 pivotally connected to lever 11. This forms a usual follow-up connection for a pilot valve controlled fluid-actuated motor to prevent overtravel of the motor, the operation of which is well understood. In the case of an elastic fluid turbine, the pressure to which bellows 1 is subjected through pipe 3 may be a pressure which bears a definite relation to an operating condition of the turbine. Structures and arrangements of this character are well known in the art and as the specific application forms no part of my present invention, but is referred to only by way of example, details of the construction are not illustrated.

Now in ordinary practice a simple elastic connection such as the bellows 1 illustrated, must have considerable mechanical strength in order to withstand the pressures to which it may be subjected which means that it must be made of fairly heavy material. As a result, a unit length of it becomes quite stiff and hence requires considerable change in pressure to distend or compress it a unit distance. To decrease the change required in the same type bellows it is necessary to increase its length in the same manner as referred to above in connection with the coiled spring example, but the permissible increased length is limited by practical considerations and is soon reached. In actual practice, therefore, simple elastic connections of the type referred to in general have had operating characteristics much higher than was desirable and also fixed characteristics which could not be changed at will.

My inverted elastic connection for overcoming the above difficulties comprises, in the specific embodiment shown in Fig. 1, four arms 20, 21, 22 and 23 and a coiled spring 24. Arms 20 and 21 are pivoted at one end to a threaded nut 25 and at their other ends to the ends of arms 22 and 23 as is indicated at 26 and 27. The other ends of arms 22 and 23 are pivoted to a block 28 adjustably mounted on lever 8. Block 28 may be slid along lever 8 and then fastened in the desired position by a set screw 29. Nut 25 is carried on a threaded rod 30, the upper end of which passes through an elongated slot 31 in a fixed support 32 and is fastened to the support by nuts 33. Slot 31 enables the lower end of the inverted elastic connection to be adjusted along with the upper end. The two ends of coiled spring 24 are connected in a suitable manner to pivot points 26 and 27. With this arrangement, it will be seen that when the left hand end of lever 8 moves upward, the spring 24 is distended, block 28 moving toward nut 25 and points 26 and 27 moving away from each other, while when it moves downward spring 24 is permitted to contract. During such movements, spring 24 is moved always in a straight line and at right angles to the direction of movement of bellows 1. By reason of the arms 22 and 23, spring 24 exerts a component force on lever 8 in a direction to tend to turn the lever on its pivot 10, the force being parallel to that exerted through bellows 1. By a proper connection of spring 24 and arms 22 and 23 to lever 8, the component force of spring 24 acting on lever 8 may be made to assist the movement of bellows 1. Now to make this component force practically useful in connection with bellows 1 to modify the characteristic of bellows 1, it must be a force having a straight line characteristic throughout its operating range. This is accomplished by using a spring 24 designed so that at any instant the distance between points 26 and 27 may be used as an indication of the force of the spring and so that the force of the spring varies in direct proportion to the distance between points 26 and 27. As is well understood by those skilled in this art, such a spring may be made by winding into it an initial tension equal to the product of its scale and free length. Such a mechanism then has an inherent straight line characteristic.

With the arrangement of arms shown, the force exerted on lever 8 by spring 24 for any position of the spring is a function of the tangent of the included angle between arms 22 and the plane of the spring, the force increasing as the tangent of the angle increases, and becoming zero when the angle is zero, that is, when arms 22 and 23 become parallel to the plane of spring 24. Also, the relative motion of the ends of the spring, that is, of pivot points 26 and 27 is a function of the tangent of this included angle, the distance between such points increasing in direct proportion to the decrease in the tangent of the angle. And since the force of spring 24 increases in direct proportion to increase in the distance between pivot points 26 and 27, this being inherent in the spring used, it is clear that the force of spring 24 increases directly as the tangent of the angle decreases. It follows, therefore, that with a spring designed after the manner stated, the component force at right angles to spring 24 will vary in direct proportion but inversely to the distance between pivot points 26 and 27. As a result, the component force exerted on lever 8 by spring 24 will have a straight line characteristic but will decrease in value as pivots 26 and 27 move away from each other and will increase in value as they move toward each other. Spring 24, therefore, exerts on lever 8, and hence on bellows 1, a force which has a straight line characteristic but which decreases as the tension of spring 24 increases.

Considering Fig. 1, it will be seen that the vertical component of spring 24 tends to turn lever 8 in an anti-clockwise direction and that bellows 1 when in a distended position, tends to turn lever 8 in a clockwise direction. If we consider a force tending to turn lever 8 in an anticlockwise direction as being a negative force and a force tending to turn lever 8 in a clockwise direction as being a positive force, then in the force-distance diagram, Fig. 2, line OA may be taken to represent the straight line characteristic of bellows 1 and line OB may be taken to represent the straight line characteristic of the vertical component of spring 24. Assuming that the characteristic of bellows 1 is the same as that of the vertical component of spring 24, and that the lever arms of lever 8 upon which they act are of equal length, then it will be clear that the resultant turning force acting on lever 8 for any positions of the lever within the range of the device will fall along the line OX. This means that the resultant force for any position of the lever 8 within the range of the device is zero. It follows, therefore, that lever 8 will be in equilibrium at any angle it may assume, or, in other words, in any position bellows 1 is exactly balanced by the vertical component spring 24. Assume now that the characteristic of bellows 1 remains the same but that the characteristic of the vertical component of spring 24 falls along the line OC in Fig. 2. The resultant of the two forces acting on lever 8 will then be represented by the dotted lines OD, Fig. 2. This means then, that the force which must be applied to bellows 1 to distend it is represented by the line OD. The characteristic of the bellows 1 has thus been modified from that represented by line OA to that represented by line OD. The change in the characteristic of the vertical component of spring 24 may be obtained by changing the spring itself or with the arrangement shown, it can be obtained by changing the relative length of the lever arms of lever 8 upon which the two devices operate. Thus it will be seen that by adjusting the inverted elastic connections along lever 8, the extent to which the inverted elastic connection modifies bellows 1 may be changed as desired.

It is essential in a device of this character that what I term the inverted elastic connection should have a straight line characteristic throughout the active range of its operation and this is one of the important results which I accomplish by my construction. I am aware that it has been proposed heretofore in connection with a corrugated bellows structure to modify the characteristic of the bellows structure by means of spring connections. However, so far as I am aware in no instance have the modifying spring connections been of a character such as to have a straight line characteristic and for this reason they have been of little if any value in actual practice, particularly where true, straight line characteristics are necessary in the operation of the mechanism to be controlled.

My invention may be embodied in connection with any apparatus wherein it is desired to employ a simple elastic connection, its utilization in connection with elastic fluid turbines being only one application. Also, the invention may take various forms. Two applications of my invention are illustrated in my applications Serial Nos. 104,234 and 104,236 filed of even date herewith.

What I claim as new and desire to secure by Letters Patent of the United States is:—

1. The combination with an elastic connection having a straight line characteristic, of means for modifying such characteristic comprising a spring which extends at a right angle to the line of movement of said elastic connection and has an initial tension equal to the product of its scale and free length, and means for moving the spring always in a straight line, said means comprising an angularly disposed arm pivoted to said elastic connection and to said spring.

2. The combination with an elastic connection having a straight line characteristic, of means for modifying such characteristic comprising a spring which extends at a right angle to the line of movement of said elastic connection and has an initial tension equal to the product of its scale and free length, two angularly disposed arms which connect the ends of said spring to said elastic connection, and means for confining the movement of the spring always in a straight line.

3. The combination with a simple elastic connection, a lever to which it is connected, and means whereby a force may be applied to the elastic connection to effect movement of the lever, of means for modifying the characteristic of said elastic connection comprising a spring which extends at a right angle to the line of movement of said elastic connection, an angularly disposed arm pivoted to said lever and to said spring, and means for confining the movement of the spring always in a straight line, the connection of said arm to said lever being adjustable along the lever.

4. The combination with an elastic connection having a straight line characteristic, of means for modifying such characteristic comprising a spring which extends at a right angle to the line of movement of said elastic connection and has an initial tension equal to the product of its scale and free length, arms pivotally connected to the ends of said spring and to each other, means connecting the ends of the arms which are pivotally connected to each other to said elastic connection, and means for confining the movement of said spring always in a straight line.

5. The combination with an elastic connection having a straight line characteristic, of means for modifying such characteristic comprising a spring which extends at a right angle to the line of movement of said elastic connection and has an initial tension equal to the product of its scale and free length, arms pivotally connected to the ends of said spring and to each other, means connecting the ends of the arms which are pivotally connected to each other to said elastic connection, and means for confining the movement of said spring always in a straight line, said last-named means comprising two arms pivotally connected at one end to the ends of said spring and at their other ends to each other and to a fixed support.

In witness whereof, I have hereunto set my hand this 21st day of April, 1926.

REGINALD G. STANDERWICK.